United States Patent
Nishina

(10) Patent No.: US 9,744,447 B2
(45) Date of Patent: Aug. 29, 2017

(54) METHODS AND APPARATUS FOR CONTROLLING AN INFORMATION PROCESSING SYSTEM BASED ON GEOGRAPHIC POSITION INFORMATION

(75) Inventor: Eiichi Nishina, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 64 days.

(21) Appl. No.: 13/981,232

(22) PCT Filed: Jan. 25, 2012

(86) PCT No.: PCT/JP2012/051502
§ 371 (c)(1),
(2), (4) Date: Jul. 23, 2013

(87) PCT Pub. No.: WO2012/102289
PCT Pub. Date: Aug. 2, 2012

(65) Prior Publication Data
US 2013/0303187 A1    Nov. 14, 2013

(30) Foreign Application Priority Data
Jan. 26, 2011    (JP) .................................. 2011-014446

(51) Int. Cl.
*A63F 13/216*    (2014.01)
*A63F 13/79*    (2014.01)
(Continued)

(52) U.S. Cl.
CPC ............ *A63F 13/216* (2014.09); *A63F 13/79* (2014.09); *H04W 4/021* (2013.01); *A63F 13/352* (2014.09);
(Continued)

(58) Field of Classification Search
CPC .............................. H04W 4/023; H04W 4/028
See application file for complete search history.

(56) References Cited

U.S. PATENT DOCUMENTS 6,650,902 B1 * 11/2003 Richton ................. H04W 4/02
455/404.2
6,824,048 B1 * 11/2004 Itabashi et al. ............... 235/380
(Continued)

FOREIGN PATENT DOCUMENTS

CN    1898974 A    1/2007
CN    101449597 A    6/2009
(Continued)

OTHER PUBLICATIONS

Office Action for corresponding KR Application No. 10-2013-7022287, dated Jul. 17, 2014.
(Continued)

*Primary Examiner* — Lester Kincaid
*Assistant Examiner* — Daniel G Bassett
(74) *Attorney, Agent, or Firm* — Matthew B. Dernier, Esq.

(57) ABSTRACT

Provided is an information processing system capable of, while avoiding running out of storage capacity, increasing the possibility that a program executed in the information processing system can use data according to a calculated position, even when the information processing system cannot receive data from a device. An item communication section (72) receives, from a server that stores data used in the program in association with a position, data associated with a position in a first-size area containing a position calculated by a positioning section (60). An item notification section (74) notifies to outside when a position associated with data received by the item communication section (72) is present in a second-size area, which contains a position calculated by the positioning section (60) and is smaller than
(Continued)

the first-size area. An application executing section (66) executes a program using data received by the item communication section (72).

11 Claims, 11 Drawing Sheets

(51) Int. Cl.
*H04W 4/02* (2009.01)
*A63F 13/352* (2014.01)
(52) U.S. Cl.
CPC ... *A63F 2300/307* (2013.01); *A63F 2300/556* (2013.01); *A63F 2300/558* (2013.01); *A63F 2300/5533* (2013.01); *A63F 2300/5553* (2013.01); *A63F 2300/5573* (2013.01)

(56) References Cited

U.S. PATENT DOCUMENTS

| | | | |
|---|---|---|---|
| 7,519,470 B2* | 4/2009 | Brasche et al. | 701/457 |
| 7,590,424 B2* | 9/2009 | Yamamoto et al. | 455/456.1 |
| 8,565,715 B2 | 10/2013 | MacDonald | |
| 2002/0177449 A1* | 11/2002 | McDonnell | G06F 21/00 455/456.1 |
| 2003/0198346 A1 | 10/2003 | Meifu | |
| 2005/0223222 A1* | 10/2005 | Graves et al. | 713/165 |
| 2007/0270133 A1 | 11/2007 | MacDonald | |
| 2008/0227447 A1* | 9/2008 | Jeong | H04W 48/10 455/434 |
| 2009/0063624 A1* | 3/2009 | Nordstrom | H04W 4/021 709/203 |
| 2009/0140886 A1* | 6/2009 | Bender | 340/988 |
| 2009/0298505 A1* | 12/2009 | Drane | H04W 4/02 455/446 |
| 2011/0117937 A1 | 5/2011 | Meifu | |
| 2011/0148634 A1* | 6/2011 | Putz | 340/541 |
| 2012/0052873 A1* | 3/2012 | Wong | H04W 52/0251 455/456.1 |

FOREIGN PATENT DOCUMENTS

| | | |
|---|---|---|
| JP | 2003090728 A | 3/2003 |
| JP | 2003319435 A | 11/2003 |
| JP | 2009129002 A | 6/2009 |
| JP | 2009271812 | 11/2009 |

OTHER PUBLICATIONS

International Preliminary Report on Patentability and Written Opinion for corresponding PCT Application No. PCT/JP2012/051502, dated Aug. 8, 2013.

International Search Report for corresponding PCT Application No. PCT/JP2012/051502, dated Apr. 24, 2012.

Office Action for corresponding CN Application No. 201280015455, dated Feb. 2, 2015.

* cited by examiner

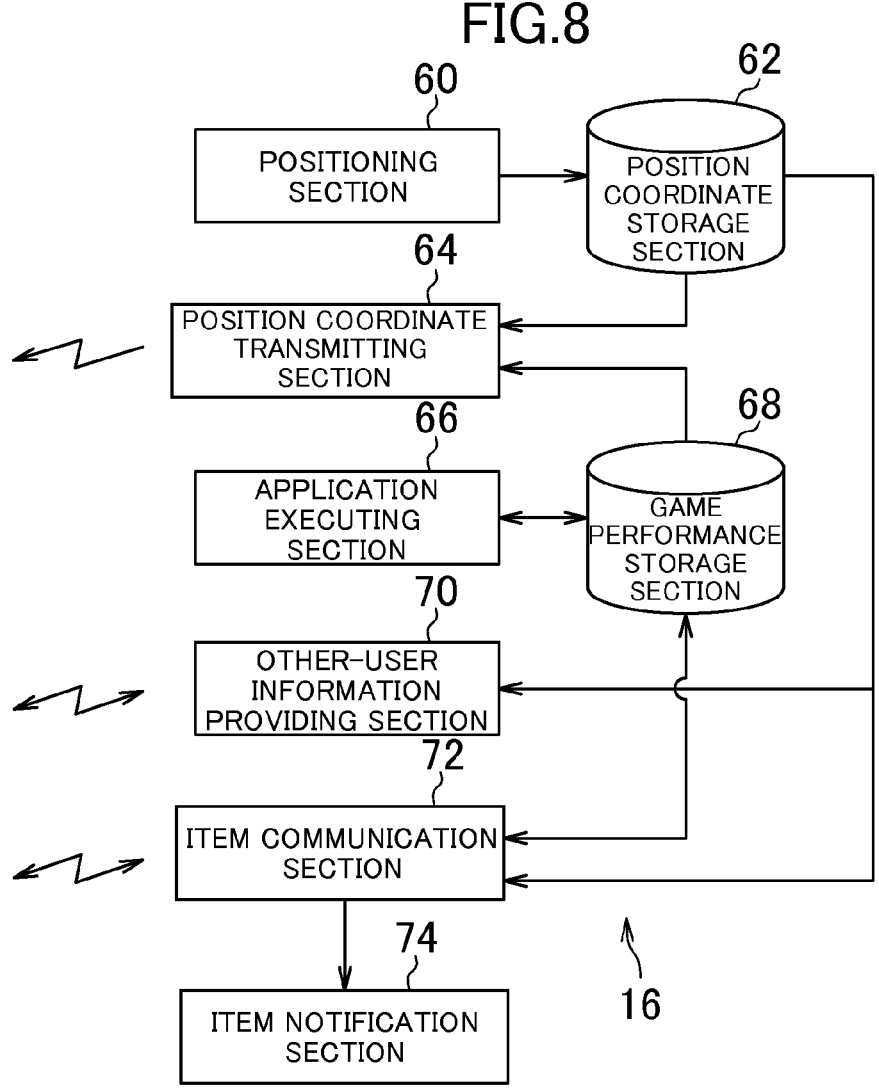
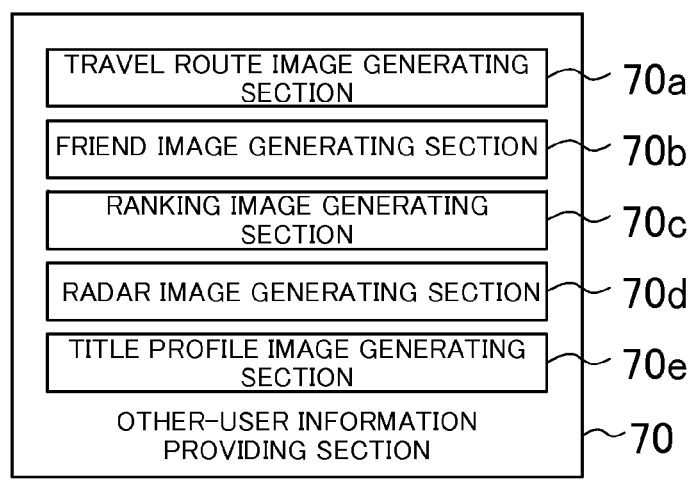

FIG.10

| POSITION COORDINATE | DATE/TIME |
|---|---|
| $(X_{01}, Y_{01})$ | 6/30/2010  12:00 |
| $(X_{02}, Y_{02})$ | 6/30/2010  12:30 |
| $(X_{03}, Y_{03})$ | 6/30/2010  13:00 |
| $(X_{04}, Y_{04})$ | 6/30/2010  14:00 |
| $(X_{05}, Y_{05})$ | 6/30/2010  14:30 |

FIG.11

| TITLE ID | LEVEL | PLAY TIME | LAST PLAY DATE/TIME |
|---|---|---|---|
| T001 | 1 | 18h | 6/25/2010  13:15 |
| T003 | 4 | 110h | 6/25/2010  15:45 |
| T024 | 2 | 52h | 7/1/2010  9:23 |
| T013 | 3 | 61h | 7/2/2010  19:34 |
| T002 | 1 | 3h | 6/23/2010  13:08 |

FIG.13

| AREA ID | TIME SLOT | GAME PERFORMANCE DATA 1 | | | GAME PERFORMANCE DATA 2 | | |
|---|---|---|---|---|---|---|---|
| | | TITLE ID | LEVEL | PLAY TIME | TITLE ID | LEVEL | PLAY TIME |
| 010010··· | 6/10/2010 12:00~18:00 | T001 | 3 | 102h | T011 | 2 | 80h |
| 010010··· | 6/10/2010 18:00~24:00 | T002 | 2 | 84h | T007 | 4 | 135h |

FIG.14

AREA ID : 010010····

| USER ID | POSITION COORDINATE | DATE/TIME |
|---|---|---|
| U001 | $(X_1, Y_1)$ | 6/8/2010  13:24 |
| U013 | $(X_2, Y_2)$ | 6/8/2010  13:25 |

FIG.15

| USER ID | LATEST POSITION COORDI-NATE SET | DATE/TIME | GAME PERFORMANCE DATA 1 | | | GAME PERFORMANCE DATA 2 | | |
|---|---|---|---|---|---|---|---|---|
| | | | TITLE ID | LEVEL | PLAY TIME | TITLE ID | LEVEL | PLAY TIME |
| U001 | $(X_n, Y_n)$ | 6/12/2010 12:10 | T001 | 1 | 18h | T003 | 4 | 110h |
| U002 | $(X_m, Y_m)$ | 6/12/2010 12:00 | T100 | 1 | 25h | T008 | 2 | 54h |

FIG.16

| AREA ID | TITLE ID | ITEM ID | USER ID | |
|---|---|---|---|---|
| 010010··· | T003 | I001 | U001 | |
| 010010··· | T003 | I002 | U001 | |

| AREA ID | TITLE ID | ITEM ID | |
|---|---|---|---|
| 010010··· | T001 | I010 | |
| 010010··· | T001 | I011 | |

U001
06/10/2011 07:00Am
Aoyama, Minato-ku, Tokyo

Expiration date
12/10/2011
07:00Am

← 104

METHODS AND APPARATUS FOR CONTROLLING AN INFORMATION PROCESSING SYSTEM BASED ON GEOGRAPHIC POSITION INFORMATION

TECHNICAL FIELD OR FIELD

The present invention relates to an information processing system, a method for controlling the information processing system, a program, and an information storage medium.

BACKGROUND ART

Positioning units, such as a GPS, have become increasingly common and are equipped with not only car navigation systems but also mobile phones and portable game terminals recently. The positioning units are expected to be employed in a wider variety of devices.

SUMMARY OF INVENTION

Technical Problem

With a portable game terminal equipped with a positioning unit such as a GPS, it is possible to provide a user who plays a game using the portable game terminal with functions to allow the user to, for example, obtain an item according to the position of the portable game terminal.

In this regard, if the portable game terminal previously stores all of data indicating items available in a game, the portable game terminal may run out of storage capacity. In addition, if a device such as a server provides a portable game terminal with data indicating items available at the current position of the portable game terminal for every time the current position, which is estimated based on the calculated position of the portable game terminal, is changed, there may be a case where, when the portable game terminal cannot communicate with the device, the device may not provide the portable game terminal with the items according to the current position of the portable game terminal. This also applies not only to items but to general data used in a game program executed in a portable game terminal. Further, this also applies not only to a game system such as a portable game terminal for executing a game program but to a general information processing system for executing a general program.

One or more embodiments of the present invention have been conceived in view of the above, and an object thereof is to prevent an information processing system from running out of storage capacity and to increase a possibility that a program executed in an information processing system can use data according to a calculated position of the information processing system even when the information processing system cannot receive data from a device.

Solution to Problem

In order to solve the above described problems, an information processing system according to the present invention includes a positioning unit that repeatedly calculates a position, a data receiving unit that receives, from a device that stores data used in a program in association with a position, data associated with a position in a predetermined first-size area containing a position calculated by the positioning unit, a notification unit that notifies to outside in a case where the position associated with the data received by the data receiving unit is present in a predetermined second-size area, which is smaller than the first-size area containing the position calculated by the positioning unit, and a program executing unit that executes the program using the data received by the data receiving unit.

A method for controlling an information processing system according to the present invention includes a positioning step that repeatedly calculates a position, a data receiving step that receives, from a device that stores data used in a program in association with a position, data associated with a position in a predetermined first-size area containing a position calculated in the positioning step, a notification step that notifies to outside in a case where the position associated with the data received in the data receiving step is present in a predetermined second-size area, which is smaller than the first-size area containing the position calculated in the positioning step, and a program executing step that executes the program using the data received in the data receiving step.

A program according to the present invention causes a computer to execute a positioning unit that repeatedly calculates a position, a data receiving unit that receives, from a device that stores data used in a program in association with a position, data associated with a position in a predetermined first-size area containing a position calculated by the positioning unit, a notification unit that notifies to outside in a case where the position associated with the data received by the data receiving unit is present in a predetermined second-size area, which is smaller than the first-size area containing the position calculated by the positioning unit, and a program executing unit that executes the program using the data received by the data receiving unit.

An information storage medium according to the present invention stores a program for causing a computer to execute a positioning unit that repeatedly calculates a position, a data receiving unit that receives, from a device that stores data used in a program in association with a position, data associated with a position in a predetermined first-size area containing a position calculated by the positioning unit, a notification unit that notifies to outside in a case where the position associated with the data received by the data receiving unit is present in a predetermined second-size area, which is smaller than the first-size area containing the position calculated by the positioning unit, and a program executing unit that executes the program using the data received by the data receiving unit.

In the present invention, the information processing system receives, from the device, data associated with a position in the first-size area and thus it is possible to prevent the information processing system from running out of storage capacity. Further, in the present invention, the information processing system notifies to outside in a case where a position associated with data received by the data receiving unit is present in the second-size area containing the position calculated by the positioning unit. As such, even if the data receiving unit cannot receive data from the device while a position associated with data received by the data receiving unit is present in the second-size area containing a position calculated by the positioning unit, it is possible to notify to outside when a position associated with data received by the data receiving unit is present in the second-size area containing a position calculated by the positioning unit. This increases the possibility that a program executed by the information processing system can use the data. In this way, according to the present invention, it is possible to prevent the information processing system from running out of storage capacity, and to increase a possibility that a program executed in the information processing system can use data according to a calculated position even when the information processing system cannot receive data from a device.

According to one embodiment of the present invention, the information processing system further includes a determination unit that determines, at predetermined time intervals, whether or not a distance between a position calculated by the positioning unit and used when the data was received previously and a position calculated most recently by the positioning unit exceeds a predetermined distance. In a case where the determination unit determines that the distance between the position calculated by the positioning unit and used when the positioning unit received data previously and the position calculated most recently by the positioning unit exceeds the predetermined distance, the data receiving unit receives, from the device, data associated with the position in the first-size area containing the position calculated most recently by the positioning unit.

According to one embodiment of the present invention, the data receiving unit receives, from the device, the data associated with the position in the first-size area containing the position calculated most recently by the positioning unit, at a timing at which the distance between the position calculated by the positioning unit and used when the positioning unit received data previously and the position calculated most recently by the positioning unit exceeds the predetermined distance.

In this embodiment, a circular area that has a radius corresponding to the predetermined distance may be included in the first-size area.

According to one embodiment of the present invention, in a case where a predetermined period of time has passed since the data was received previously and the distance between the position calculated by the positioning unit and used when the positioning unit received data previously and the position calculated most recently by the positioning unit exceeds the predetermined distance, the data receiving unit receives, from the device, the data associated with the position in the first-size area containing the position calculated most recently by the positioning unit. In a case where the distance between the position calculated by the positioning unit and used when the positioning unit received data previously and the position calculated most recently by the positioning unit exceeds a predetermined second reference distance, which is longer than the first reference distance, the data receiving unit receives, from the device, the data associated with the position in the first-size area containing the position calculated most recently by the positioning unit, even if the predetermined period of time has not passed since the data was received previously.

In this embodiment, a circular area that has a radius corresponding to the predetermined second reference distance may be included in the first-size area.

According to one embodiment of the present invention, in a case where, after the data receiving unit receives data, a program using the data is installed into the information processing system, the program executing unit executes, at a time the installed program is executed, the program using the data received by the data receiving unit.

BRIEF DESCRIPTION OF DRAWINGS

FIG. 8 A function block diagram of the user terminal.

FIG. 9 A diagram illustrating a configuration of an other user information providing section.

FIG. 10 A diagram schematically illustrating data in a position coordinate storing section.

FIG. 11 A diagram schematically illustrating data in a game performance data storing portion.

FIG. 13 A diagram schematically illustrating data in an area-based title ID storing section.

FIG. 14 A diagram schematically illustrating data in an area-based user ID storing section.

FIG. 15 A diagram schematically illustrating data in a user information storing section.

FIG. 16 A diagram schematically illustrating an example of gift data.

FIG. 17 A diagram schematically illustrating an example of treasure data.

FIG. 18 A diagram schematically illustrating an example of gift data confirmation image.

DESCRIPTION OF EMBODIMENTS

An embodiment of the present invention is described in detail below with reference to the drawings.

Figure 1:
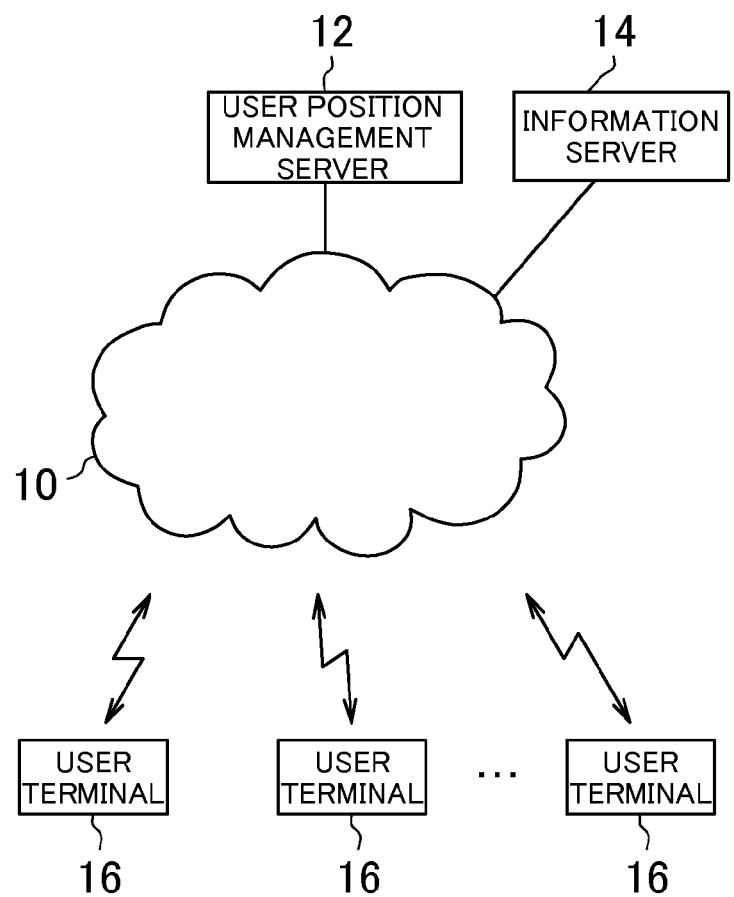
FIG. 1 A diagram illustrating an overall configuration of a communication system according to an embodiment of the present invention.
Figure 2:
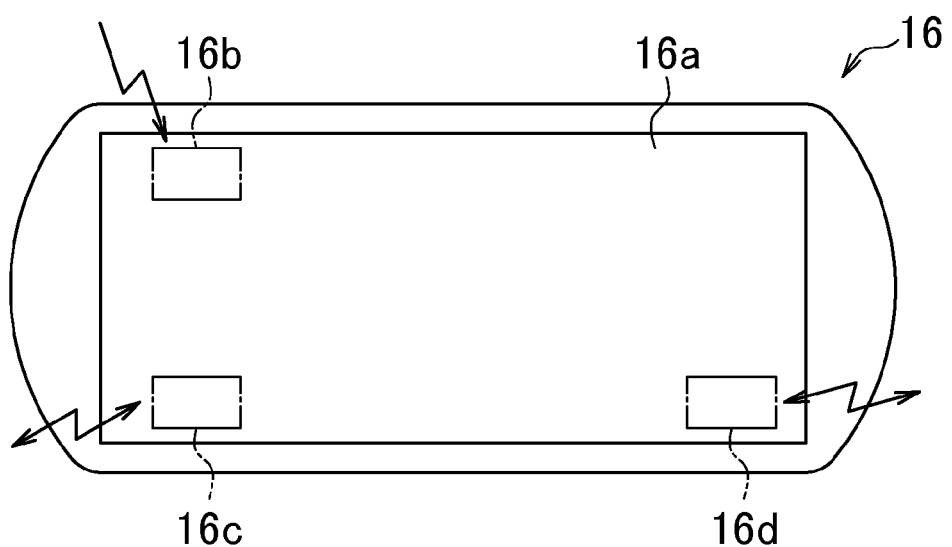
FIG. 2 A diagram illustrating the external appearance of a user terminal.

FIG. 1 is an overall configuration diagram of a communication system according to the embodiment of this invention. As illustrated in FIG. 1, the communication system includes a user position management server 12, an information server 14, and a plurality of user terminals (information processing devices) 16 which are connected to a computer communication network 10 such as the Internet. The user position management server 12 and the information server 14 are constituted mainly of known server computers, for example. Each user terminal 16 is a portable computer game system driven on a battery, and has a touch screen 16a on the front as illustrated in an exterior view of FIG. 2. The user terminal 16 also has, as built-in components, a positioning unit 16b, which uses Global Positioning System (GPS) to calculate the position (the latitude and longitude) of the user terminal 16, a cellular phone communication unit 16c, which communicates data over a cellular phone network, and a wireless LAN communication unit 16d, which communicates data over a wireless LAN. The user terminal 16 selectively uses one of the cellular phone communication unit 16c and the wireless LAN communication unit 16d that is suitable for the communication environment to connect to the computer communication network 10, and communicates data with the user position management information server 12 and the information server 14.

Figure 3:
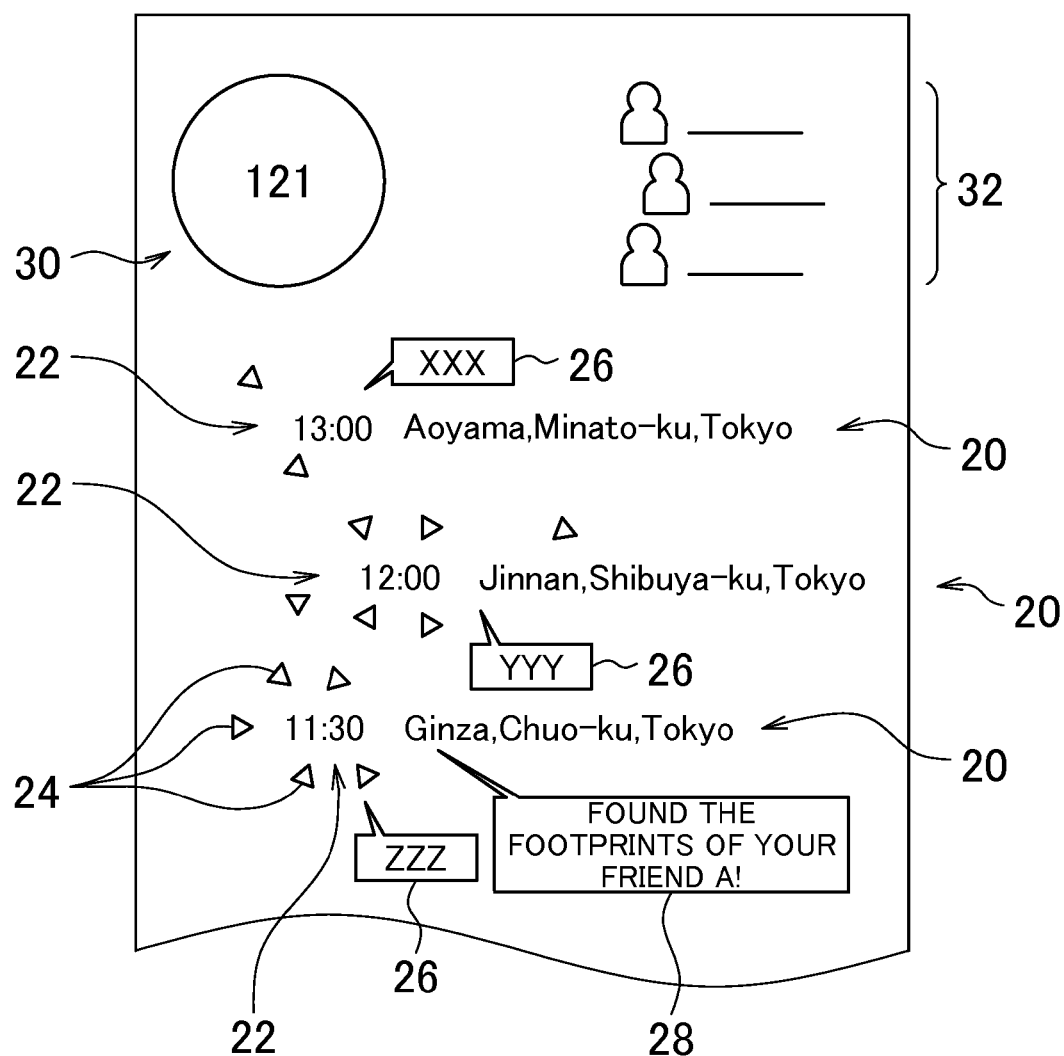
FIG. 3 A diagram illustrating an example of a travel route image.

The user terminal 16 repeatedly calculates its own position with the use of satellite signals and holds the results of the positioning. The user terminal 16 also holds data that indicates game program execution performance. The positioning results and the game execution performance data are uploaded to the user position management server 12 manually when the user operates the user terminal 16 to do so, or automatically at regular time intervals. The user position management server 12 holds positioning results and execution performance data that are uploaded from many user terminals 16 in this manner. Each user terminal 16 displays on the touch screen 16a a travel route image of the user terminal 16 as shown in FIG. 3 based on the information held on the user position management server 12 and the positioning results held by itself. The travel route image has a shape that is longer in height than in width, and only a part of the travel route image which is set to a display range is displayed on the touch screen 16a. The user can move the display range by making a given operation on the touch screen 16a.

As shown in FIG. 3, the lower area of the travel route image includes images of the travel route of the user terminal 16. As described above, the user terminal 16 repeatedly calculates its own position and holds the calculated positions. The lower area of the travel route image displays address letter strings 20 each indicating a held position and a calculating date/time 22, in the order that the positions have been calculated. Specifically, newer calculation results are displayed at the top. At this time, although the positioning unit 16b repeatedly calculates the position of its own user terminal 16, the user terminal 16 keeps a record of a newly calculated position only when the newly calculated position is at a given distance (for example, 2 km) or more from the latest position that has been held in the user terminal 16. The user terminal 16 does not keep a record of a newly calculated position when the distance between the newly calculated position and the latest held position is shorter than the given distance. As such, the travel route image does not display two address letter strings 20 in the up-down direction, if the position of one of the address letter strings 20 is less than the given distance from the position of the other address letter string. This way, the travel route image displays only significant travels and therefore is easy to comprehend. In addition, because displaying insignificant information is prevented, the touch screen 16a can be used efficiently.

A plurality of small images 24 are displayed around each calculating date/time 22 in the lower area of the travel route image. More small images 24 are displayed the greater the number of other user terminals 16 that have uploaded the same position to the user position management server 12. This enables the user to grasp at a glance whether or not many of other users carrying the user terminals 16 have been at each position. A title 26 of a featured game program is also displayed in each calculating date/time 22.

On the lower area of the travel route image, when a user terminal 16 of another friend user has calculated and uploaded to the user position management server 12 the same position as the position calculated and uploaded to the user position management server 12 by the user terminal 16, the user terminal 16 displays a message 28 such as "found the footprints of your friend A!" to indicate that the friend has been at the same position.

On an upper left area 30 of the travel route image, the user terminal 16 displays a total number of the users who have calculated and uploaded to the user position management server 12 the same positions as calculated and uploaded to the user position management server 12 by the user terminal 16. In addition, on an upper right area 32, there is displayed information relating to other users who are friends of the user.

Figure 4:
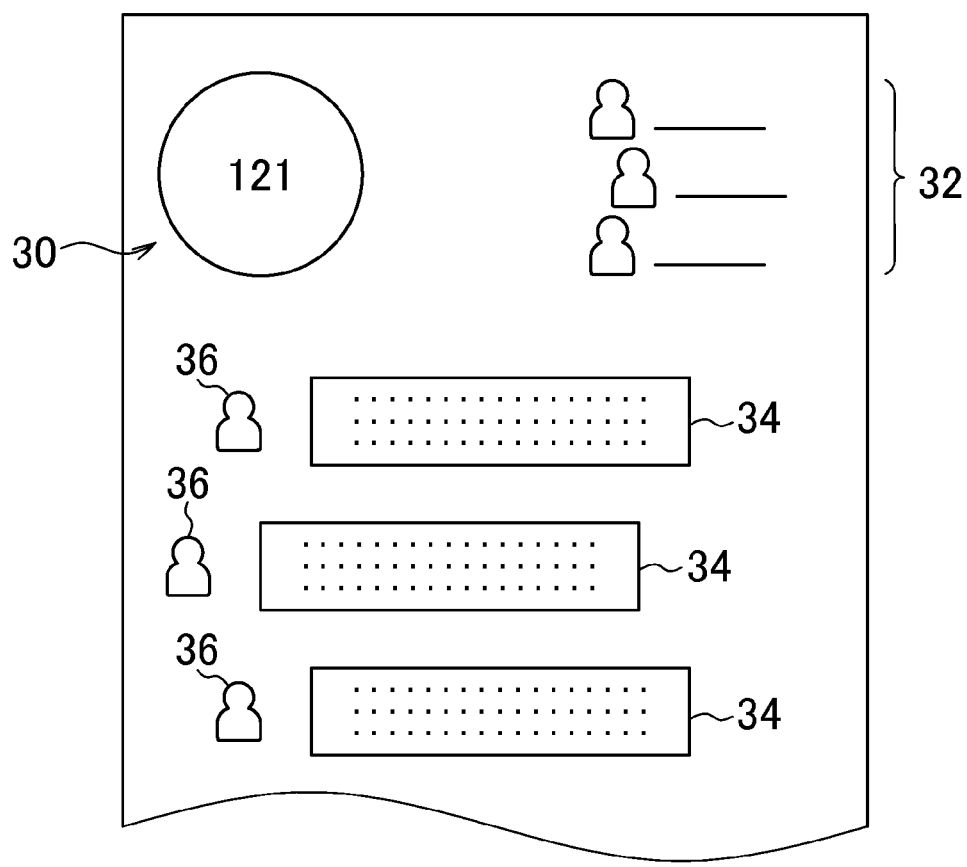
FIG. 4 A diagram illustrating an example of a friend image.

FIG. 4 illustrates a friend image which is displayed on the touch screen 16a when the upper right area 32 is tapped by the user in the travel route image of FIG. 3. As shown in FIG. 4, an avatar image 36 of each friend and an item of latest information 34 about the friend are displayed on the lower area of the friend image. The latest information 34 is received from, for example, an information server 14. The friend image also has a shape that is longer in height than in width, and only a part of the friend image which is set to a display range is displayed on the touch screen 16a. The user can move the display range by making a given operation on the touch screen 16a.

Figure 5:
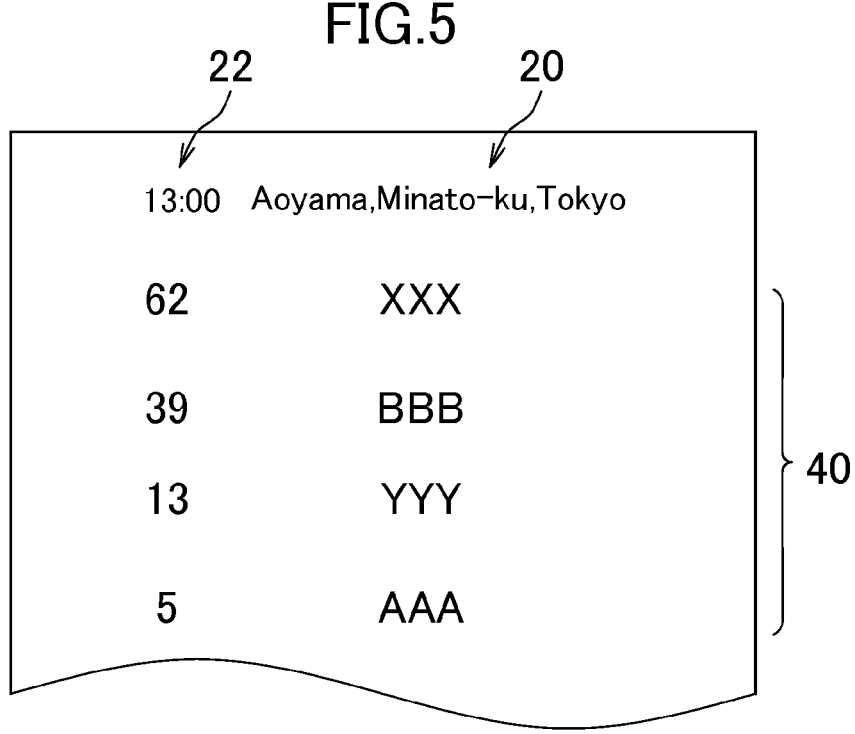
FIG. 5 A diagram illustrating an example of a ranking image.

FIG. 5 illustrates a ranking image which is displayed on the touch screen 16a when the user taps the address letter string 20 in the travel route image of FIG. 3. As illustrated in FIG. 5, an upper area of the ranking image displays an address letter string 20 tapped by the user and a calculating date/time 22 of the position indicated by the tapped address letter string 20. A lower area of the ranking image displays the titles of game programs that have been played on the user terminals 16 from which the position indicated by the address letter string 20 have been uploaded to the user position management server 12. The game titles are displayed in descending order of the number of the user terminals 16 on which the game programs having those titles have been played. Displayed to the left of each title is the number of user terminals 16 on which the game program having the title has been played. The ranking image, too, has a shape that is longer in height than in width, and only a part of the ranking image which is set to a display range is displayed on the touch screen 16a. The user can move the display range by making a given operation on the touch screen 16a.

Figure 6:
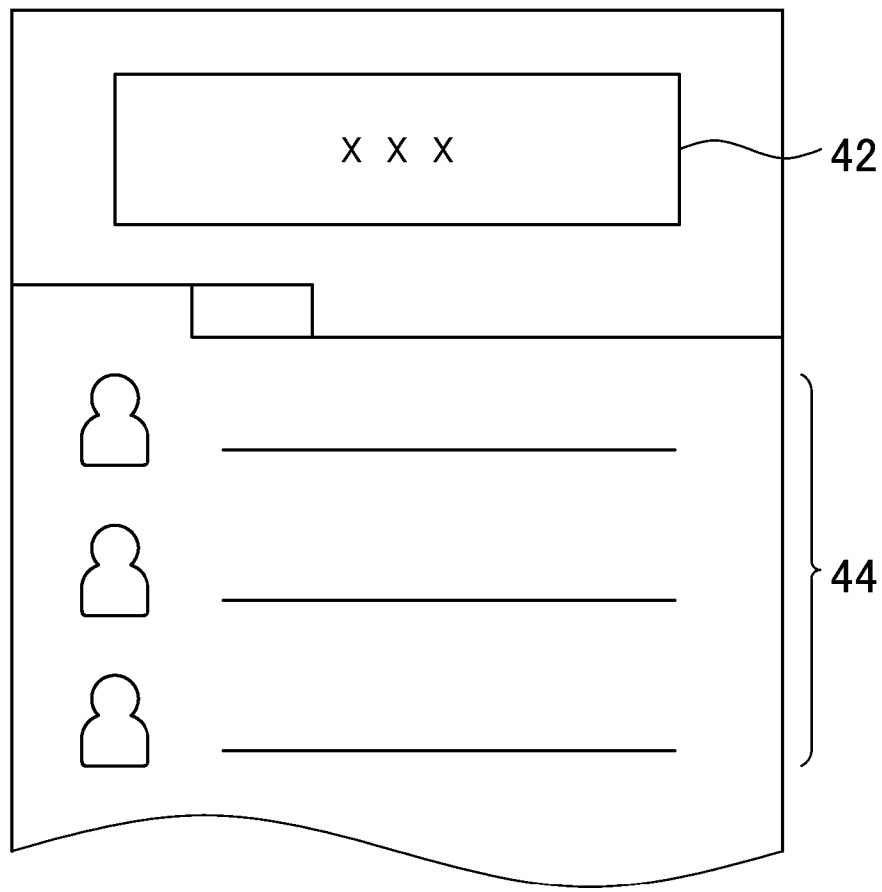
FIG. 6 A diagram illustrating an example of a title profile image.

FIG. 6 illustrates a title profile image which is displayed on the touch screen 16a when one of game programs is tapped in the ranking image of FIG. 5 or one of the titles 26 is tapped in the travel route image of FIG. 3. An upper area of the title profile image contains a title image 42 of the game program. A lower area of the title profile image contains an information field 44 which shows evaluations given by other users on the game program and other users' play status of the game program. The title image 42 or information on the information field 44 is also received from, for example, the information server 14. The title profile image, too, has a shape that is longer in height than in width, and only a part of the ranking image which is set to a display range is displayed on the touch screen 16a. The user can move the display range by making a given operation on the touch screen 16a.

Figure 7:
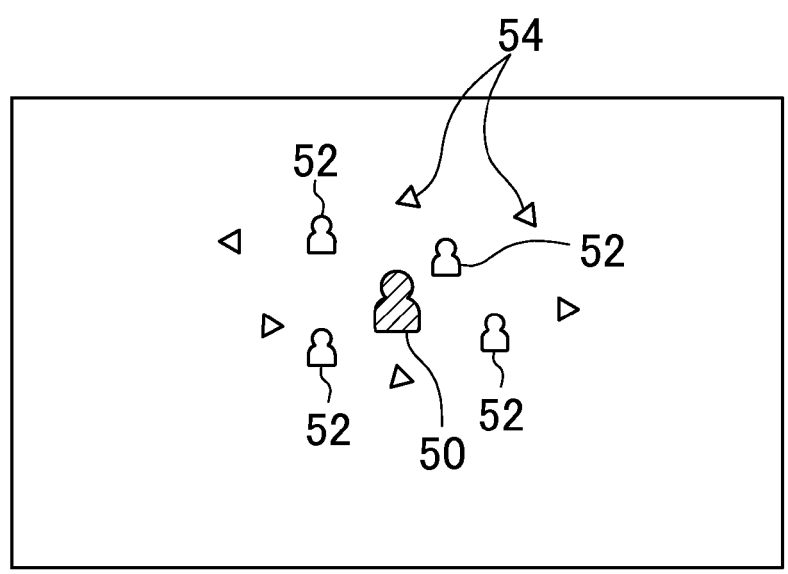
FIG. 7 A diagram illustrating an example of a radar image.

FIG. 7 illustrates a radar image which is displayed on the touch screen 16a when the address letter string 20 is tapped in the ranking image of FIG. 5. A avatar image 50 which represents the user in question is displayed at the center of the radar image, and avatar images 52 of other users whose privacy settings are set to "public" are displayed around the avatar image 50. The radar image also displays small images 54, which suggest the presence of other users whose privacy settings are set to "private", around the avatar image 50. The display position of each of the avatar images 50 and the avatar images 52 on the touch screen 16a is determined based on a position actually calculated by the positioning unit 16b. In other words, based on a position calculated by the positioning unit 16b and uploaded to the user position management server 12, the user terminal 16 calculates the positions of other "public" users relative to its own position and, based on the calculated relative positions, determines the display positions of the avatar images 52 on the touch screen 16a. The display positions of the small images 54 on the touch screen 16a, on the other hand, are determined by random numbers.

The configuration of the communication system described above is described in more detail. FIGS. 8 and 9 are function block diagrams of each user terminal 16. As illustrated in FIG. 8, the user terminal 16 includes as functional components a positioning section 60, a position coordinate storage section 62, a position coordinate transmitting section 64, an application executing section 66, a game performance storage section 68, an other-user information providing section 70, an item communication section 72, and an item notification section 74. The other-user information providing section 70 includes, as illustrated in FIG. 9, a travel route image generating section 70a, a friend image generating section 70b, a ranking image generating section 70c, a radar image generating section 70d, a title profile image generating section 70e. These function components are implemented by executing a program according to the embodiment of the present invention on the user terminal 16, which is a computer game system. This program may be downloaded from another computer via the computer communication network 10, or may be stored in a computer-readable information storage medium such as a CD-ROM or a DVD-ROM to be installed in the user terminal 16. In the latter case, the user terminal 16 has a built-in or external medium reading device for reading the program out of the medium.

The positioning section 60 is constituted mainly of the positioning unit 16b. The positioning section 60 periodically (for example, every thirty minutes) activates the positioning unit 16b to receive satellite signals (GPS signals) and generate position coordinates (latitude and longitude) from the received signals. The positioning section 60 may activate the positioning unit 16b to receive satellite signals and generate position coordinates from the received signals also when the user gives via the touch screen 16a an explicit instruction to perform positioning. Alternatively, the positioning section 60 may obtain the position coordinates of the user terminal 16 based on identification information and other types of necessary information of a wireless access point with which the wireless LAN communication unit 16d can communicate. For instance, a not-shown server stores in advance identification information of a wireless access point in association with position coordinates, and the positioning section 60 transmits identification information to the server to obtain position coordinates that are associated with the identification information. The positioning section 60 may transmit, to the server, identification information of a plurality of wireless access points and the intensity of radio waves from each wireless access point. The server in this case performs weighting based on the radio wave intensity, combines the position coordinates of the wireless access points to calculate the position coordinate of the user terminal 16, and returns the calculated coordinates to the positioning section 60. Similarly, the position coordinates of the user terminal 16 may be obtained based on identification information and other types of necessary information of a cellular phone base station with which the cellular phone communication unit 16c can communicate. Instead of the positioning section 60 obtaining the position coordinates of the user terminal 16 and transmitting the obtained coordinates to the user position management server 12, the user position management server 12 may obtain position coordinates indicated by identification information and other types of necessary information of a wireless access point or a cellular phone base station that are transmitted from the positioning section 60.

As illustrated in FIG. 10, the position coordinate storage section 62 stores a given number of (for example, ten) position coordinate sets and calculating dates/times of the position coordinates in association with each other. The positioning section 60 reads position coordinates stored last in the position coordinate storage section 62 each time new position coordinates are generated, and calculates the distance between the newly generated position coordinates and the read position coordinates. When the calculated distance is equal to or more than a given distance (for example, 2 km), the position coordinate storage section 62 stores the newly generated position coordinates along with the calculating date/time of the position coordinates. At this point, position coordinates that have been stored longer than a given number of days (seven days, for example) are deleted along with the calculating date/time of the expired position coordinates. If the position coordinate storage section 62 is storing the given number of position coordinate sets in association with their calculating dates/times and none of the position coordinate sets have been stored longer than the given number of days, the oldest position coordinates and their calculating date/time are deleted in order to store newly generated position coordinates and their calculating date/time instead. When the distance between the newly generated position coordinates and the read position coordinates is less than the given distance, on the other hand, the new position coordinates are discarded instead of being stored in the position coordinate storage section 62.

The application executing section 66 executes an application program such as a game program. The application program may be downloaded from another computer via the computer communication network 10 or may be stored in a computer-readable information storage medium such as a CD-ROM or a DVD-ROM to be installed in the user terminal 16.

As illustrated in FIG. 11, the game performance storage section 68 stores a title ID, a viewing level, a total play time, and a last play date/time in association with each other for each of a given number of (for example, five) game programs that have been executed lately by the application executing section 66. The title ID is information for identifying each game program. The total play time indicates the total length of time the game program identified by the title ID has been played. The viewing level is information indicating how enthusiastic the user is about the game program which is calculated from e.g., the total play time. The last play date/time indicates the date/time (activation date/time or shutdown date/time) when the game program has been played the last time.

The position coordinate transmitting section 64 uses the cellular phone communication unit 16c or the wireless LAN communication unit 16d to transmit, to the user position management server 12, the plurality of position coordinate sets and their calculating dates/times stored in the position coordinate storage section 62, and the title IDs, viewing levels, and total play times of the given number of game programs stored in the game performance storage section 68. This transmission may be executed when the user gives through the touch screen 16a an explicit instruction to transmit. At this time, it is preferred if the position coordinate transmitting section 64 displays a plurality of position coordinate sets and their calculating dates/times stored in the position coordinate storage section 62 on the touch screen 16a to check whether or not the user wishes to transmit the displayed position coordinate sets and calculating dates/times. The position coordinate transmitting section 64 may be further capable of removing position coordinate sets and their calculating dates/times that the user does not wish to transmit and transmitting only the rest to the user position management server 12. The user may set the user terminal 16 to omit this checking. In this case, a plurality of position coordinate sets and their calculating dates/times stored in the position coordinate storage section 62 are transmitted automatically and periodically (for example, once a day). The other-user information providing section 70, the item communication section 72, and the item notification section 74 are described later.

Figure 12:
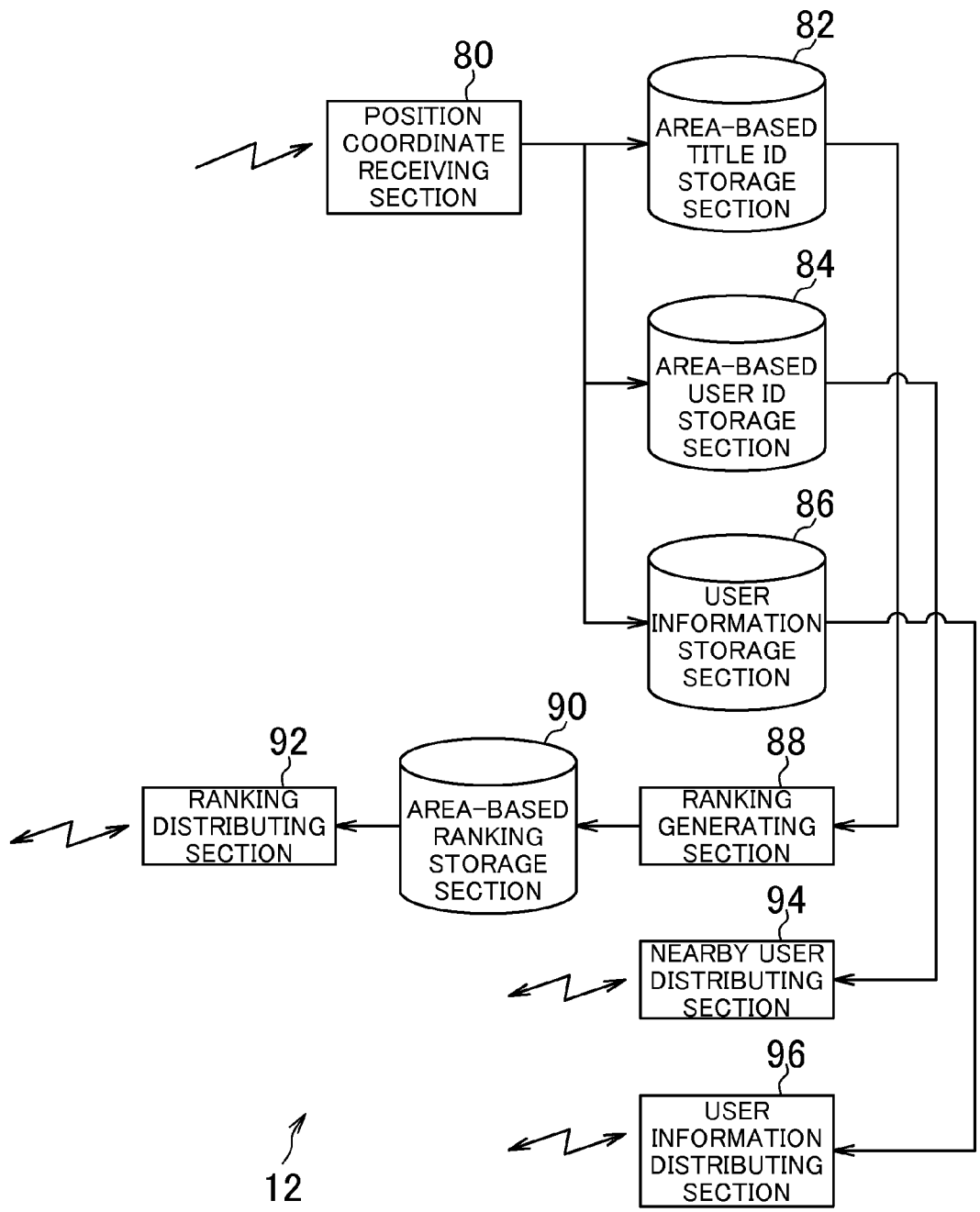
FIG. 12 A function block diagram of a user position management server.

FIG. 12 is a function block diagram of the user position management server 12. As illustrated in FIG. 21, the user position management server 12 includes as functional components a position coordinate receiving section 80, an area-based title ID storage section 82, an area-based user ID storage section 84, a user information storage section 86, a ranking generating section 88, an area-based ranking storage section 90, a ranking distributing section 92, a nearby user distributing section 94, and a user information distributing section 96. These function components are implemented by executing the program according to the embodiment of the present invention on the user position management server 12, which is a computer. This program may be downloaded from another computer via the computer communication network 10, or may be stored in a computer-readable information storage medium such as a CD-ROM or a DVD-ROM to be installed in the user position management server 12.

The position coordinate receiving section 80 receives a plurality of position coordinate sets and their calculating dates/times and game performance data (title IDs, viewing levels, and total play times) of the given number of game programs which are transmitted from the position coordinate transmitting section 64 of each user terminal 16.

As illustrated in FIG. 13, the area-based title ID storage section 82 stores an area ID, a time slot, and a given number of (for example, twenty) game performance data pieces in association with one another. The area ID is information for identifying (specifying) each mesh cell area created by dividing a management subject area (for example, the entire area covering the Earth) into a plurality of mesh cells. The time slot is information for identifying a time range having a given length of time (for example, six hours). Each game performance data piece contains a title ID, a viewing level, and a total play time. In other words, the area-based title ID storage section 82 stores a given number of (for example, twenty) game performance data pieces in association with an area ID and a time slot. When receiving a plurality of position coordinate sets and their calculating dates/times and a given number of game performance data pieces from one user terminal 16, the position coordinate receiving section 80 derives for each received position coordinate set the area ID of an area that contains the position coordinate set. The position coordinate receiving section 80 also derives a time slot that contains the calculating date/time of the received position coordinate set. The position coordinate receiving section 80 stores the game performance data received from the user terminal 16 in the area-based title ID storage section 82 in association with the derived area ID and the derived time slot. If the given number of game performance data pieces are already stored in a relevant part of the area-based title ID storage section 82 at this point, the oldest game performance data is deleted and the game performance data received this time is stored instead.

As illustrated in FIG. 14, the area-based user ID storage section 84 stores for each area ID a user ID, a position coordinate set, and a calculating date/time in association with one another. When receiving a plurality of position coordinate sets and their calculating dates/times, and the title IDs, viewing levels, and total play times of a given number of game programs from one user terminal 16, the position coordinate receiving section 80 derives for each received position coordinate set the area ID of an area that contains the position coordinate set. The user ID of the user who is using the user terminal 16 and the received position coordinate set and calculating date/time are stored in the area-based user ID storage section 84 in association with the derived area ID. A position coordinate set and its calculating date/time that has been stored longer than a given length of time (for example, one week) is deleted from the area-based user ID storage section 84.

As illustrated in FIG. 15, the user information storage section 86 stores a user ID, a latest position coordinate set, a calculating date/time, and a given number of (for example, twenty) game performance data pieces in association with one another. When receiving a plurality of position coordinate sets and their calculating dates/times, and a given number of game performance data pieces of one user terminal 16, the position coordinate receiving section 80 stores the position coordinate set obtained last and its calculating date/times and the received given number of game performance data pieces in the user information storage section 86 in association of the user ID of the user who is using the user terminal 16.

The ranking generating section 88 generates the ranking of game titles for each area ID based on data stored in the area-based title ID storage section 82. For instance, the number of game performance data pieces that are stored on an area ID basis in the area-based title ID storage section 82 in association with time slots within a given period of time (for example, past one month) are aggregated for each title ID, and top ten titles are used to generate ranking. Data of this ranking includes the total game performance data count (gross player count) of each title ID. Alternatively, viewing levels of game performance data that are stored on an area ID basis in the area-based title ID storage section 82 in association with time slots within a given period of time (for example, past one month) are averaged for each title ID, and top ten of the average values are used to generate ranking. Data of this ranking, too, includes the total game performance data count (gross player number) of each title ID. Data of the generated ranking is stored in the area-based ranking storage section 90 in association with area IDs. The ranking distributing section 92 receives a set of position coordinates from one user terminal 16, derives the area ID of an area that contains the received position coordinate set, reads ranking that is stored in the area-based ranking storage section 90 in association with the derived area ID, and returns the read ranking to the user terminal 16.

The nearby user distributing section 94 receives a set of coordinates and the specification of a search area size from one user terminal 16, and sets as the search area a group of n×n (e.g., 1×1, 3×3, 5×5, 7×7, 9×9, . . . , 25×25) areas that include the area containing the received position coordinate set (for example, at the center point of the area). The variable n is determined by the specification of a search area size received from the user terminal 16. The nearby user distributing section 94 then reads every user ID and every position coordinate set that are stored in the area-based user ID storage section 84 in association with the area ID of each area constituting the determined search area and returns the read user ID and position coordinate set to the user terminal 16.

The user information distributing section 96 receives a user ID from one user terminal 16, and returns to the user terminal 16 the latest position coordinate set, its calculation data, and a given number of game performance data pieces that are stored in the user information storage section 86 in association with the received user ID. When the user of one user terminal 16 wishes to see on the touch screen 16a the title of a game that is being played by a specific user, the user may receive this information from the user information distributing section 96.

Processing executed by each user terminal 16 to display various screens is described. The other-user information providing section 70 of the user terminal 16 includes, as described above, the travel route image generating section 70a, the friend image generating section 70b, the ranking image generating section 70c, the radar image generating section 70d, the title profile image generating section 70e.

The travel route image generating section 70a generates the travel route image of FIG. 3. To generate the travel route image, the travel route image generating section 70a first reads position coordinate sets and their calculating dates/times out of the position coordinate storage section 62. Subsequently, the travel route image generating section 70a obtains for each position coordinate set an address letter string 20 that corresponds to the position coordinate set. The address letter string 20 may be stored in the user terminal 16 in advance in association with a range of position coordinates, or may be stored in the information server 14 in the same manner. In the latter case, when a set of position coordinates is transmitted to the information server 14, the information server 14 reads an address letter string 20 associated with a range that contains the transmitted position coordinate set, and transmits the read address letter string to the user terminal 16. Address letter strings 20 obtained in this manner are included along with calculating dates/times 22 in the travel route image in the order of calculating date/times 22. Specifically, the calculating date/times 22 and the address letter strings 20 are placed side by side in a way that newer pairs of the calculating date/time 22 and the address letter string 20 are placed at the top.

Next, the travel route image generating section 70a transmits to the user position management server 12 each position coordinate set stored in the position coordinate storage section 62 to request to generate ranking. In response to the request, the ranking distributing section 92 of the user position management server 12 derives the area ID of an area that contains the received position coordinate set, reads ranking that is stored in the area-based ranking storage section 90 in association with the derived area ID, and returns the read ranking to the user terminal 16. In the case where ranking associated with the same area ID has already been received from the user position management server 12, the travel route image generating section 70a compares the already received ranking and the newly received ranking. A game title with a rank that has increased most and a game title that has increased most in values that are the basis of the ranking (the total game performance data count, an average value of viewing levels, and the like) are included in the travel route image as hot titles (Reference Symbol 26). In the case where ranking associated with the same area ID has not been received yet from the user position management server 12, a game title that has the highest rank in the currently received ranking is included in the travel route image as a hot title.

The travel route image generating section 70a transmits to the user position management server 12 each position coordinate set stored in the position coordinate storage section 62 and a size specification that specifies 1×1 area as the search area, thereby requesting the user position management server 12 to search for nearby users. In response to the request, the nearby user distributing section 94 of the user position management server 12 derives the area ID of an area that contains the received position coordinate set, reads every user ID and every position coordinate set that are stored in the area-based user ID storage section 84 in association with the derived area ID, and returns the read user ID and position coordinate set to the user terminal 16. The travel route image generating section 70a counts up the number of user IDs associated with each position coordinate set, and displays small images 24, the number of the small images 24 being according to the counted number of user IDs, in the neighborhood of the calculating date/time concerning the position coordinate set. Further, the travel route image generating section 70a adds up the number of user IDs associated with each position coordinate set, and displays the number in the upper left area 30.

The user terminal 16 stores the user IDs of friends of its own user. The user terminal 16 receives information associated with the stored user IDs from the information server 14, and includes the information in the upper right area 32. When the user ID of a friend stored in the user terminal 16 is included among user IDs transmitted from the nearby user distributing section 94 of the user position management server 12, the user terminal 16 displays a message 28 below the address letter string 20 related to the user ID. The travel route image generated in this manner is displayed on the touch screen 16a.

The friend image generating section 70b generates the friend image of FIG. 4. To generate the friend image, the friend image generating section 70b reads friend user IDs stored in the user terminal 16, and receives an avatar image 36 and latest information 34 associated with the read user IDs from the information server 14. The latest information 34 can be messages entered by friend users from their user terminals 16 or other computers, and messages automatically generated by game programs that are executed on the user terminals 16 or other computers to indicate the game program execution state (the progress of the game, the skill level of players, and the like). The latest information is included in lower areas of entries in the friend image to complete the friend image. The friend image generated in this manner is displayed by the touch screen 16a.

The ranking image generating section 70c generates the ranking image of FIG. 5. The ranking image generating section 70c transmits a position coordinate set specified by the user to the user position management server 12, and receives ranking data from the ranking distributing section 92. The ranking image is generated based on the thus received ranking data. The generated ranking image is displayed by the touch screen 16a. The ranking image generating section 70c may receive ranking data concerning a plurality of position coordinate sets (for example, all position coordinate sets) stored in the position coordinate storage section 62 to add up for each title the values that are the basis of ranking generation (the total game performance data count, an average value of viewing levels, and the like), generate ranking from the sum, and generate and display the ranking image. This way, the user terminal 16 can display comprehensive ranking at a plurality of positions that the user has visited.

The title profile image generating section 70e generates the title profile image of FIG. 6. The title profile image generating section 70e transmits a title ID to the information server 14 and receives the title image 42 and information to be written in the information field 44. Based on the thus received information, the title profile image is generated. The generated title profile image is displayed by the touch screen 16a.

The radar image generating section 70d generates the radar image of FIG. 7. To generate the radar image, the radar image generating section 70d first transmits to the user position management server 12 a set of coordinates stored in the position coordinate storage section 62 that is specified by the user and a size specification that specifies a 1×1 area as the search area, and thereby requests a search for nearby users. The radar image generating section 70d then receives user IDs and sets of position coordinates that are sent from the nearby user distributing section 94 of the user position management server 12 in response to the request. If the number of the received user IDs is less than ten, the radar image generating section 70d transmits to the user position management server 12 the same position coordinate set along with a size specification that specifies 2×2 areas as the search area, to thereby request a search for nearby users again. The radar image generating section 70d repeatedly requests the user position management server 12 to execute a search for nearby users until the number of user IDs and position coordinate sets received reaches ten or higher, or until the size of the search area reaches M×M (M is a given number) areas. The radar image is generated based on user IDs and position coordinate sets received from the nearby user distributing section 94 in this manner. Specifically, the radar image generating section 70d reads out, from the user terminal 16, its own avatar image 50 stored in advance, and places the avatar image 50 at the center of the touch screen 16a. The radar image generating section 70d calculates the difference between the position coordinate set specified by the user and each position coordinate set received from the nearby user distributing section 94 to determine the display positions of the avatar images 52 representing other users. In other words, the radar image generating section 70d displays the avatar images 52 at positions that are based on the positions of other user terminals 16 relative to the position of its own user terminal 16. The radar image generating section 70d also calculates the sum of gross player counts (the sum of gross player counts of all game titles) which are received from the ranking distributing section 92 when the travel route image is generated, and places a number of small images 54 that is determined by the calculated sum in the radar image at random. The radar image generated in this manner, too, is displayed by the touch screen 16a.

The item communication section 72 exchanges data such as an item used in a game program. The application executing section 66 generates an item when a game program is executed, and stores a title ID, which is identification information of the game program, and identification information of this item (an item ID) in association with each other into the game performance storage section 68. Once a title ID and an item ID are stored in the game performance storage section 68 in this manner, the item communication section 72 transmits the title ID and the item ID to the user position management server 12 along with a relevant position coordinate set stored in the position coordinate storage section 62. The user position management server 12 stores a combination of the title ID, the item ID, and a relevant user ID in association with the area IDs of areas that contain the position coordinate set. In the following, data containing an area ID, a title ID, an item ID, and a user ID associated with one another is referred to as gift data 100 (see FIG. 16). FIG. 16 schematically illustrates an example of gift data 100 stored in the user position management server 12. The uploading of an item ID is completed in this manner.

In this embodiment, the user position management server 12 also stores in advance treasure data 102 containing e.g., an area ID, a title ID, and an item ID as shown in FIG. 17.

The gift data 100 and the treasure data 102 may be associated with data indicating an expiration date or a predetermined condition (e.g., "only friend user can use this data").

The item communication section 72 also receives the gift data 100 and the treasure data 102, each stored in the user position management server 12, at a predetermined timing. In this case, the item communication section 72 transmits a position coordinate set stored in the position coordinate storage section 62 to the user position management server 12. The user position management server 12 returns the gift data 100 and the treasure data 102, which are stored in association with an area ID of one of a predetermined number of groups of areas (e.g., p×p areas corresponding to 100 km square) that are specified based on the received position coordinate set and includes the received position coordinate set, for example, at the center of the areas. The item communication section 72 causes the game performance storage section 68 to store the gift data 100 and treasure data 102 received in this way in association with the position coordinate set transmitted to the user position management server 12 and the time and date when the gift data 100 and the treasure data 102 were received.

In this embodiment, when gift data 100 and treasure data 102 are stored in the game performance storage section 68, if gift data 100 or treasure data 102 to be stored is already stored in the game performance storage section 68, the item communication section 72 does not write such data into the game performance storage section 68. In addition, in this embodiment, when gift data 100 and treasure data 102 are stored in the game performance storage section 68, the item communication section 72 deletes the gift data 100 and the treasure data 102, which are stored in association with an area ID of an area that does not belong to a predetermined number of groups of areas (e.g., p×p areas corresponding to 100 km square) that are specified based on the position coordinate set stored in the position coordinate storage section 62 and includes the position coordinate set stored in the position coordinate storage section 62 (for example, at the center of the area). In this way, in this embodiment, it is possible to prevent the user terminal 16 from running out of storage capacity.

In this embodiment, the user terminal 16 stores in advance data indicating a time to check the reception of gift data 100 and treasure data 102 (e.g., check at 1:00 a.m. daily). At the time indicated by the data, the item communication section 72 calculates a distance that the user terminal 16 has traveled since the time when the data was received previously. In this regard, the item communication section 72 calculates the distance based on the position coordinate set, which is associated with the date and time when the data was received previously, in the gift data 100 and the treasure data 102 stored in the game performance storage section 68, and on the latest position coordinate set stored in the position coordinate storage section 62. Then, the item communication section 72 determines whether or not the calculated travel distance exceeds a predetermined first reference distance (e.g., 2 km). If it exceeds, as described above, the item communication section 72 transmits the latest position coordinate set stored in the position coordinate storage section 62 to the user position management server 12. The user position management server 12 then returns the gift data 100 and the treasure data 102 stored in association with an area ID of one of a predetermined number of groups of areas that includes an area containing the received position coordinate set. On the other hand, if it does not exceed, the item communication section 72 do not receive the gift data 100 and the treasure data 102. In this way, the item communication section 72 determines whether or not to receive the gift data 100 and the treasure data 102 at predetermined intervals (e.g., once in a day).

Further, in this embodiment, the item communication section 72 calculates, for each time the position coordinate storage section 62 stores the latest position coordinate set, a distance that the user terminal 16 has traveled since the time when the data was received previously. In this regard, the item communication section 72 calculates the distance based on the position coordinate set corresponding to the date and time when the data was received by the item communication section 72 previously (e.g., position coordinate set associated with the calculating date and time which is closest to the date and time when the data was received by the item communication section 72 previously) and stored in the position coordinate storage section 62, and on the latest position coordinate set stored in the position coordinate storage section 62. The item communication section 72 then determines whether or not the calculated travel distance exceeds a predetermined second reference distance (e.g., 50 km). If it exceeds, as described above, the item communication section 72 transmits the latest position coordinate set stored in the position coordinate storage section 62 to the user position management server 12. The user position management server 12 then returns the gift data 100 and the treasure data 102 stored in association with an area ID of one of a predetermined number of groups of areas that includes an area containing the received position coordinate set. As described above, in this embodiment, the predetermined second reference distance (e.g., 50 km) is half of a length of one side of an area (e.g., 100 km) containing a predetermined number of groups of areas (e.g., p×p areas corresponding to 100 km square). Further, based on the position coordinate set transmitted from the user terminal 16 to the user position management server 12, a circular area having a radius corresponding to the predetermined second reference distance (e.g., 50 km) is included in an area containing a predetermined number of groups of areas (e.g., p×p areas corresponding to 100 km square) specified by the user position management server 12. This reduces the possibility that, in this embodiment, the user terminal 16 has not stored the gift data 100 and the treasure data 102 associated with an area ID of an area including the current position of the user terminal 16. In this regard, the circular area having the radius corresponding to the predetermined second reference distance (e.g., 50 km) may match the area containing the predetermined number of groups of areas mentioned above.

As described above, in this embodiment, it is determined at predetermined intervals (e.g., once in a day) whether or not the user terminal 16 has traveled a distance more than the first reference distance. If the user terminal 16 has traveled a distance more than the first reference distance, the item communication section 72 receives the gift data 100 and the treasure data 102. Further, regardless of the determination at the time intervals mentioned above, if the user terminal 16 has traveled a distance more than the second reference distance, the item communication section 72 receives the gift data 100 and the treasure data 102 even if a predetermined time period (e.g., one day) has not passed since the last time it is determined whether or not to receive the gift data 100 and the treasure data 102.

The item notification section 74 determines, for each time the position coordinate storage section 62 stores the latest position coordinate set, whether or not the game performance storage section 68 stores the gift data 100 and treasure data 102, which are associated with an area ID of one of q×q number of groups of areas (here, q<p) that are specified based on the latest position coordinate set and include the area containing the latest position coordinate set at, for example, the center position. Then, if it is determined that the gift data 100 and treasure data 102 are stored, the item notification section 74 notifies to outside (to a user) that the gift data 100 and the treasure data 102 are present by way of, for example, making a button provided on the user terminal 16 to emit light, displaying a message on a display of the user terminal 16 that the gift data 100 and the treasure data 102 are present by using such as a popup window, making the vibrator to vibrate if the user terminal 16 has a vibrator, and, making the speakers to output the sound (e.g., alarm tone) if the user terminal 16 has speakers. In this way, the user can know that there are the gift data 100 and the treasure data 102. In this embodiment, the presence of the gift data 100 and the treasure data 102 is detected based on whether or not the game performance storage section 68 stores the gift data 100 and the treasure data 102, which are associated with an area ID of one of q×q number of groups of areas that are specified based on the latest position coordinate set. Thus, it is possible to detect whether or not the gift data 100 and the treasure data 102 are present near the user terminal 16 even if the user position management server 12 cannot communicate with the user terminal 16 at the time of the detection.

In this embodiment, an item, which is identified by an item ID included in the gift data 100 and the treasure data 102 stored in the game performance storage section 68, is available in a game program executed by the application executing section 66. Further, for example, when a user performs a predetermined operation on the user terminal 16 while it is notified that the gift data 100 is present, a gift data confirmation image 104, which indicates content of the gift data 100 as shown in FIG. 18, may be displayed on the display. In this regard, for example, if the gift data 100 has an expiration date, as shown in FIG. 18, the gift data confirmation image 104 indicating its expiration date may be displayed. In addition, when a user performs a predetermined operation on the user terminal 16 while it is notified that the treasure data 102 is present, a treasure data confirmation image (not shown), which is similar to the gift data confirmation image 104, may of course be displayed.

Among the gift data 100 and the treasure data 102 stored in the game performance storage section 68, only data that satisfies a predetermined condition may be selected as a target to be notified by the item notification section 74 or data available in a game program as an item. Further, the item communication section 72 may cause the game performance storage section 68 to store only data that satisfies the condition.

For example, the item communication section 72 may calculate the degree of compatibility between its own user ID and a user ID contained in the gift data 100 so that, only when the calculated degree of compatibility is equal to or larger than a given value, the item notification section 74 may issue a notification or an item identified by an item ID contained in the gift data 100 may be available in a game program. Here, the degree of compatibility may be calculated based on, for example, information associated with a user ID available from the information server 14 (e.g., attributes such as gender, age group, title ID of game in hand, and genre of content). Specifically, in a case where gender (or age group) of the user and gender (or age group) of another user associated with a user ID contained in the gift data 100 match, the degree of compatibility may be set higher than a case where they do not match. In addition, for example, the larger the number of games owned by both of a user and another user associated with a user ID contained in the gift data 100, the higher the degree of their compatibility may be set.

Alternatively, the item notification section 74 may notify only an item identified by an item ID contained in the gift data 100 that includes a user ID of the user's friend, or an item identified by the item ID contained in the gift data 100 may be available in a game program.

Further, alternatively, only when a game program identified by a title ID contained in the gift data 100 is installed in the user terminal 16, the item notification section 74 may issue a notification, or an item identified by the item ID contained in the gift data 100 may be available in a game program.

Alternatively, even if a game program, which is identified by a title ID contained in the treasure data 102 stored in the game performance storage section 68, is not installed in the user terminal 16 at the time when the treasure data 102 is stored in the game performance storage section 68, an item identified by an item ID contained in the treasure data 102 may be available in the game program if the game program identified by a title ID contained in the treasure data 102 is installed in the user terminal 16 after the treasure data 102 is received.

According to the communication system described above, a user can be aware of the presence of other users living in the same area without using short-distance wireless communication. In addition, the trail of positions calculated by the positioning unit 16b can be displayed in a manner easy for the user to comprehend without a map displayed on the touch screen 16a.

The present invention is not limited to the embodiment described above, and various modifications can be made to the invention. For instance, in the description given above, the area-based user ID storage section 84 accumulates the user IDs of users who have obtained position coordinates inside areas identified by their respective area IDs through positioning within a given period of time (e.g., one week) and uploaded the position coordinates to the user position management server 12. When the user terminal 16 transmits position coordinates to the user position management server 12, the nearby user distributing section 94 identifies the area ID of an area that contains the received position coordinates and returns a user ID and a position coordinate set that are stored in the area-based user ID storage section 84 in association with the identified area ID. The user terminal 16 uses the returned information to generate the radar image and display a message in the travel route image. In short, in the example described above, information about the user terminals 16 that have calculated positions in the same area by positioning within a given period of time (e.g., one week) is provided from the user position management server 12.

In a modification example, on the other hand, the nearby user distributing section 94 returns a calculating date/time in addition to a user ID and a position coordinate set that are stored in association with the identified area ID. In other words, the nearby user distributing section 94 returns a user ID, a position coordination set, and a calculating date/time in combination. The user terminal 16 reads a calculating date/time of each position coordinate set out of the position coordinate storage section 62 to select a calculating date/time returned from the nearby user distributing section 94 that differs from one of the read calculating dates/times by a given length of time or less, and displays information related to a returned combination that includes this calculating date/time. For instance, the user terminal 16 receives from the information server 14 information (e.g., latest information 34) about a user who is identified by the user ID included in the selected combination to display the information, and displays the avatar image 52 that represents this user ID in the radar image. Alternatively, if the user ID included in the selected combination is a friend user ID stored in advance, the user terminal 16 may display a message 28. This enables the user terminal 16 to display on the touch screen 16a information about other user terminals 16 that have performed positioning inside the same area within a given length of time from the time of its own positioning. The user terminal 16 may also calculate the difference between a stored calculating date/time and a returned calculating date/time and the difference between a stored position coordinate set and a returned position coordinate set to select a returned combination whose calculating date/time differs from a stored calculating date/time by a given length of time or less and whose position coordinate set differs from a stored position coordinate set by a given distance or less, and to display information about the selected combination. This way, the user terminal 16 can display on the touch screen 16a information about other user terminals 16 that are deduced to have been close in time and space both.

In another modification example, when the user terminal 16 transmits a set of position coordinates to the user position management server 12, the nearby user distributing section 94 identifies the area ID of an area that contains the received position coordinates and reads a combination of a user ID and a position coordinate set that is stored in the area-based user ID storage section 84 in association with the identified area ID. The nearby user distributing section 94 selects a read combination whose position coordinate set differs from the position coordinate set transmitted from the user terminal 16 by a given distance or less. The nearby user distributing section 94 returns the selected combination to the user terminal 16. Based on the returned information, the user terminal 16 generates the radar image and displays a message on the travel route image. This way, the user terminal 16 can display on the touch screen 16a only information about other user terminals 16 that have performed positioning within a given distance from itself.

In still another modification example, the user terminal 16 transmits a set of position coordinates and its calculating date/time to the user position management server 12. The nearby user distributing section 94 identifies the area ID of an area that contains the received position coordinates, and reads a combination of a user ID, a position coordinate set, and a calculating date/time that is stored in the area-based user ID storage section 84 in association with the identified area ID. The nearby user distributing section 94 selects a read combination whose calculating date/time differs from the calculating date/time transmitted from the user terminal 16 by a given length of time or less, and returns the selected combination to the user terminal 16. Alternatively, the nearby user distributing section 94 selects a combination whose calculating date/time differs from the received calculating time by a given length of time or less and whose position coordinate set differs from the received position coordinate set by a given distance or less, and returns the selected combination to the user terminal 16. Based on the returned information, the user terminal 16 generates the radar image and displays a message on the travel route image. This way, the user terminal 16 can display on the touch screen 16a information about other user terminals 16 that are deduced to have been close in time and space both.

In yet still another modification example, the area-based user ID storage section 84 stores, for each combination of an area ID and its associated time slot, a user ID, a position coordinate set, and a calculating date/time that are associated with the user terminal 16 that has calculated, by positioning, a position inside an area identified by the area ID at a date/time within the time slot. The user terminal 16 transmits a set of position coordinates and its calculating date/time to the user position management server 12. The nearby user distributing section 94 identifies the area ID of an area that contains the received position coordinates, and identifies a time slot that contains the received calculating date/time. The nearby user distributing section 94 returns a combination of a user ID, a position coordinate set, and a calculating date/time that is stored in the area-based user ID storage section 84 in association with the identified area ID and the identified time slot. Based on the returned information, the user terminal 16 generates the radar image and displays a message on the travel route image. This way, the user terminal 16 can display on the touch screen 16a information about other user terminals 16 that are deduced to have been close in time and space both.

The invention claimed is:

1. An information processing system, comprising:
   a positioning unit that calculates respective geographic positions, including a current geographic position, of a mobile user terminal and stores a current position coordinate of the current geographic position when a predetermined position criteria is met, including that the mobile user terminal has moved by at least a first predetermined distance;
   a data receiving unit that receives, from a server, predetermined data associated with a predetermined first-size geographic area only when the current position coordinate is within such first-size geographic area;
   a notification unit that notifies a user of the mobile user terminal when the current position coordinate is within a predetermined second-size geographic area, which is smaller than, and within, the first-size geographic area; and
   a program executing unit that executes a program, where the program is permitted to start using the received predetermined data only when the current position coordinate is within the predetermined second-size geographic area, wherein
   the predetermined data associated with the predetermined first-size geographic area include an area ID uniquely identifying the predetermined first-size geographic area,
   the predetermined first-size geographic area is among a plurality of first-size geographic areas including a further predetermined first-size geographic area having a further area ID uniquely identifying the further predetermined first-size geographic area, and
   when the mobile user terminal moves from the predetermined first-size geographic area into the further predetermined first-size geographic area and receives further predetermined data associated with the further predetermined first-size geographic area, the data receiving unit compares the area ID of the predetermined first-size geographic area with the further area ID of the further predetermined first-size geographic area and on the basis of such comparison deletes the predetermined data associated with the predetermined first-size geographic area in favor of the further predetermined data associated with the further predetermined first-size geographic area.

2. The information processing system according to claim 1, further comprising:
   a determination unit that determines when the predetermined position criteria is met by, at predetermined time intervals, determining whether or not a distance between a previous position coordinate stored by the positioning unit and the current position coordinate calculated by the positioning unit exceeds the first predetermined distance,
   wherein the data receiving unit receives, from the server, the predetermined data associated with the predetermined first-size geographic area within which the current position coordinate is located only when the predetermined position criteria is met.

3. The information processing system according to claim 1, wherein the data receiving unit receives, from the server, the predetermined data associated with the predetermined first-size geographic area within which the current position coordinate is located only when the determination unit determines that a distance between a previous position coordinate stored by the positioning unit and the current position coordinate calculated by the positioning unit exceeds a second predetermined distance, greater than the first predetermined distance.

4. The information processing system according to claim 3, wherein a circular area that has a radius corresponding to the first predetermined distance is included in the first-size area.

5. The information processing system according to claim 1, wherein the data receiving unit receives, from the server, the predetermined data associated with the predetermined first-size geographic area within which the current position coordinate is located only when a determination unit determines that one and/or the other of the following criteria are met:
   at a predetermined time interval, that a distance between a previous position coordinate stored by the positioning unit and the current position coordinate calculated by the positioning unit exceeds the first predetermined distance; and
   that the distance between the previous position coordinate stored by the positioning unit and the current position coordinate calculated by the positioning unit exceeds a second predetermined distance, greater than the first predetermined distance.

6. The information processing system according to claim 5, wherein a circular area that has a radius corresponding to the second predetermined distance is included in the first-size area.

7. The information processing system according to claim 1, wherein, in a case where, after the data receiving unit receives the predetermined data, the program is installed into the information processing system, the program executing unit executes, at a time the installed program is executed, the program using the predetermined data received by the data receiving unit.

8. The information processing system of claim 1, wherein the predetermined data further includes:
   (i) a title ID, indicating the program among a plurality of programs that are executable via the program executing unit; and
   (ii) an item ID, indicating a specific function of the program among a plurality of functions of the program that may only be executed when the current position coordinate is within the predetermined second-size geographic area.

9. A method for controlling an information processing system comprising:
- calculating respective geographic positions, including a current geographic position, of a mobile user terminal;
- storing a current position coordinate of the current geographic position when a predetermined position criteria is met, including that the mobile user terminal has moved by at least a first predetermined distance;
- receiving, from a server, predetermined data associated with a predetermined first-size geographic area only when the current position coordinate is within such first-size geographic area;
- notifying a user of the mobile user terminal when the current position coordinate is within a predetermined second-size geographic area, which is smaller than, and within, the first-size geographic area; and
- executing a program, where the program is permitted to start using the received predetermined data only when the current position coordinate is within the predetermined second-size geographic area, wherein
- the predetermined data associated with the predetermined first-size geographic area include an area ID uniquely identifying the predetermined first-size geographic area,
- the predetermined first-size geographic area is among a plurality of first-size geographic areas including a further predetermined first-size geographic area having a further area ID uniquely identifying the further predetermined first-size geographic area, and
- when the mobile user terminal moves from the predetermined first-size geographic area into the further predetermined first-size geographic area and receives further predetermined data associated with the further predetermined first-size geographic area, the receiving step includes comparing the area ID of the predetermined first-size geographic area with the further area ID of the further predetermined first-size geographic area, and on the basis of such comparison, deleting the predetermined data associated with the predetermined first-size geographic area in favor of the further predetermined data associated with the further predetermined first-size geographic area.

10. A program stored in a non-transitory computer readable information storage medium, which is to be executed by a computer, the program including instructions for:
- calculating respective geographic positions, including a current geographic position, of a mobile user terminal;
- storing a current position coordinate of the current geographic position when a predetermined position criteria is met, including that the mobile user terminal has moved by at least a first predetermined distance;
- receiving, from a server, predetermined data associated with a predetermined first-size geographic area only when the current position coordinate is within such first-size geographic area;
- notifying a user of the mobile user terminal when the current position coordinate is within a predetermined second-size geographic area, which is smaller than, and within, the first-size geographic area; and
- executing a program, where the program is permitted to start using the received predetermined data only when the current position coordinate is within the predetermined second-size geographic area, wherein
- the predetermined data associated with the predetermined first-size geographic area include an area ID uniquely identifying the predetermined first-size geographic area,
- the predetermined first-size geographic area is among a plurality of first-size geographic areas including a further predetermined first-size geographic area having a further area ID uniquely identifying the further predetermined first-size geographic area, and
- when the mobile user terminal moves from the predetermined first-size geographic area into the further predetermined first-size geographic area and receives further predetermined data associated with the further predetermined first-size geographic area, the receiving step includes comparing the area ID of the predetermined first-size geographic area with the further area ID of the further predetermined first-size geographic area, and on the basis of such comparison, deleting the predetermined data associated with the predetermined first-size geographic area in favor of the further predetermined data associated with the further predetermined first-size geographic area.

11. A non-transitory computer readable information storage medium storing a program which is to be executed by a computer, the program including instructions to:
- calculating respective geographic positions, including a current geographic position, of a mobile user terminal;
- storing a current position coordinate of the current geographic position when a predetermined position criteria is met, including that the mobile user terminal has moved by at least a first predetermined distance;
- receiving, from a server, predetermined data associated with a predetermined first-size geographic area only when the current position coordinate is within such first-size geographic area;
- notifying a user of the mobile user terminal when the current position coordinate is within a predetermined second-size geographic area, which is smaller than, and within, the first-size geographic area; and
- executing a program, where the program is permitted to start using the received predetermined data only when the current position coordinate is within the predetermined second-size geographic area, wherein
- the predetermined data associated with the predetermined first-size geographic area include an area ID uniquely identifying the predetermined first-size geographic area,
- the predetermined first-size geographic area is among a plurality of first-size geographic areas including a further predetermined first-size geographic area having a further area ID uniquely identifying the further predetermined first-size geographic area, and
- when the mobile user terminal moves from the predetermined first-size geographic area into the further predetermined first-size geographic area and receives further predetermined data associated with the further predetermined first-size geographic area, the receiving step includes comparing the area ID of the predetermined first-size geographic area with the further area ID of the further predetermined first-size geographic area, and on the basis of such comparison, deleting the predetermined data associated with the predetermined first-size geographic area in favor of the further predetermined data associated with the further predetermined first-size geographic area.

* * * * *